United States Patent [19]
Larson

[11] Patent Number: 5,325,934
[45] Date of Patent: Jul. 5, 1994

[54] HIGHLY MANEUVERABLE TRAILER DRIVER

[76] Inventor: Raymond L. Larson, 2623 E. 223rd St., Long Beach, Calif. 90810

[21] Appl. No.: 142,902
[22] Filed: Oct. 25, 1993
[51] Int. Cl.⁵ ............................................. B62D 51/06
[52] U.S. Cl. .................................... 180/13; 180/19.2; 280/DIG. 11
[58] Field of Search ...................... 180/13, 12, 11, 295, 180/19.1, 19.2, 21, 14.1, 14.2, 16, 904; 280/DIG. 11, 476.1; 254/418, 89 R

[56] References Cited

U.S. PATENT DOCUMENTS

| | | |
|---|---|---|
| 3,515,233 | 6/1970 | Stammen ................................ 180/13 |
| 3,672,459 | 6/1972 | Rankins ................................ 180/13 |
| 3,770,070 | 11/1973 | Smith .................................... 180/13 |
| 3,783,960 | 1/1974 | Feliz ................................... 180/14.2 |
| 3,861,482 | 1/1975 | Stephens et al. ...................... 180/13 |
| 3,865,204 | 2/1975 | Bueckner, Sr. ....................... 180/12 |
| 4,162,711 | 7/1979 | Cornelius ............................. 180/13 |
| 4,186,813 | 2/1980 | Burdick ................................ 180/13 |
| 4,799,698 | 1/1989 | Markovic ............................. 280/46 |
| 4,860,841 | 8/1989 | Sacco .................................. 180/13 |
| 5,016,720 | 5/1991 | Coker .................................. 180/13 |

Primary Examiner—Margaret A. Focarino
Assistant Examiner—Florian Zeender
Attorney, Agent, or Firm—Macro-Search Corp.

[57] ABSTRACT

A trailer driver for moving and supporting a trailer is disclosed. A frame provides a base for supporting two downwardly facing opposing arms. A fixed bearing extends upwardly from the base and supports a vertical hitch shaft that is rotatably engaged within the bearing. A trailer hitch clamp is removably fixed to the hitch shaft and is adapted for holding a trailer hitch. The hitch shaft engaging a cover and further provides a fixed steering sprocket coaxial with the hitch shaft. A drive wheel is rotatably mounted on a horizontal axle, which is positioned between the two arms of the frame, and engages a drive sprocket for rotating therewith on the axle. An electric motor is fixed to the frame and provides a driven sprocket interconnected with the drive sprocket by a first drive belt. A drive circuit drives the motor in either a forward or reverse direction. A steering assembly includes a rotatable steering shaft held in a fixed position by the cover and provides a rotatable steering sprocket at one end and a steering arm at the other end. The rotatable sprocket is interconnected by a second drive belt to a fixed steering sprocket. Rotation of the steering arm results in rotation of the frame and drive wheel with respect to the hitch shaft and the cover means, so as to enable the trailer driver to be steered. A dolly is further included for moving the trailer driver and for storing the trailer driver in an upright orientation.

6 Claims, 3 Drawing Sheets

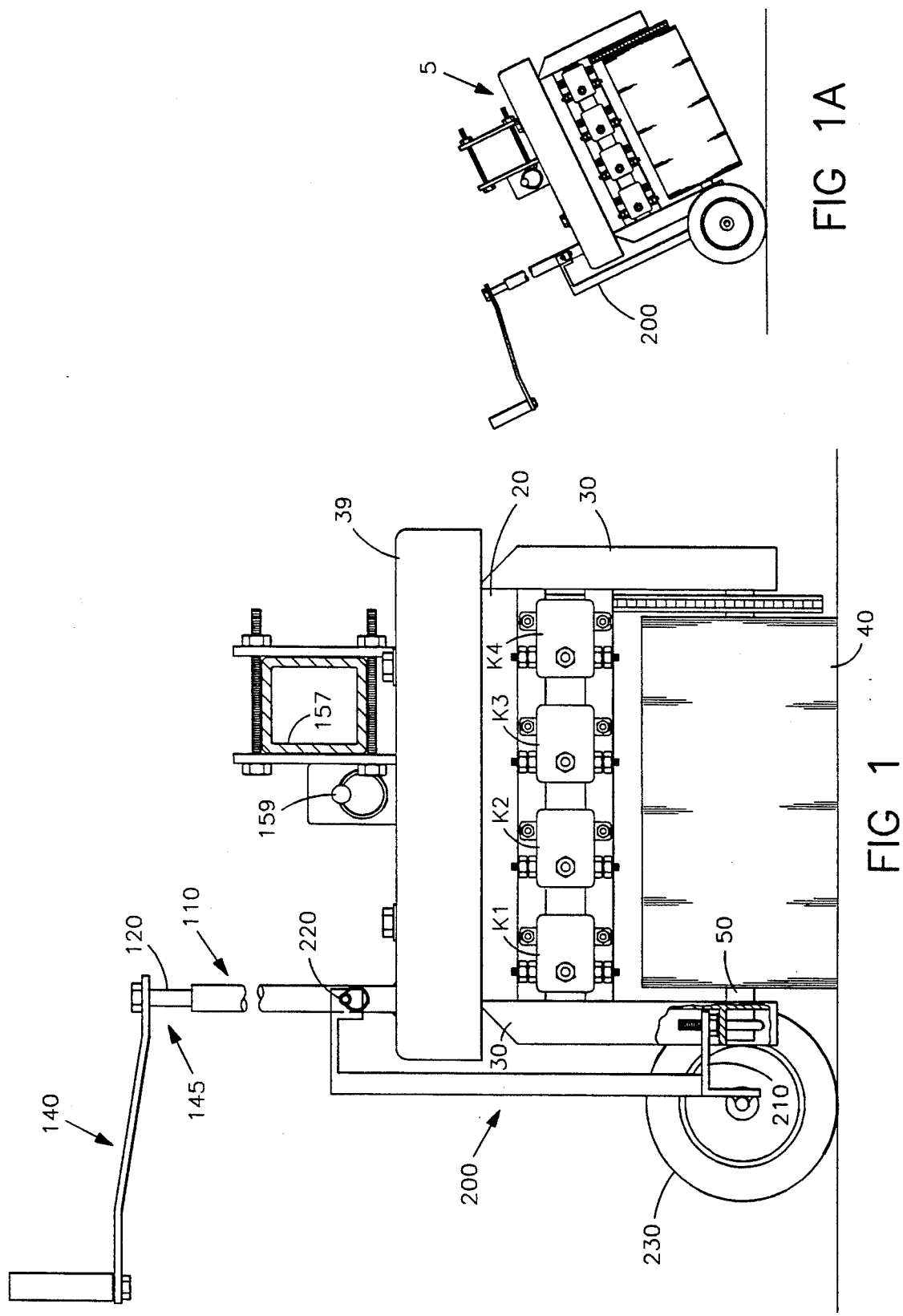

HIGHLY MANEUVERABLE TRAILER DRIVER

FIELD OF THE INVENTION

This invention relates generally to land vehicle drivers and, more particularly, is directed towards a portable device for moving and maneuvering a trailer.

BACKGROUND OF THE INVENTION

Several motorized trailer drivers are found in the prior art. For example, U.S. Pat. No. 4,860,841 to Sacco on Aug. 29, 1989 teaches such a device, as to do U.S. Pat. Nos. 4,162,711 to Cornelius on Jul. 31, 1979; 3,861,482 to Stephens et al. on Jul. 21, 1975; 3,783,960 to Feliz on Jan. 8, 1974; and 3,770,070 to Smith on Nov. 6, 1973. Such devices have not found widespread acceptance in the market due to several drawbacks associated with such devices. Primarily, such prior art devices, particularly with large trailers, tend to be difficult to steer due to a lack of steering leverage. Further, while such devices are designed to aid in maneuvering a trailer, such devices are difficult to move and maneuver themselves when not connected to a trailer. Several of the prior art devices are designed for permanent attachment to the trailer, rendering them useless for moving other trailers. While there are several other prior art devices designed for removable use with trailers, such devices are not easily attached to or removed from the trailers, making their use difficult.

Clearly, then, there is a need for a trailer moving device that is relatively easy to steer while moving a trailer to which it is connected. Such a needed device would itself by easy to move and store, and would provided a simplified, easy-to-use attachment for attaching to the trailer. Such a needed device would further provide high traction with the ground. The present invention fulfills these needs and provides further related advantages.

SUMMARY OF THE INVENTION

The present invention is a trailer driver for moving and supporting a trailer. An inverted U-shaped frame provides a base for supporting two opposing arms. A fixed bearing extends upwardly from the base and supports a vertical hitch shaft that is rotatably engaged within the bearing. A trailer hitch clamp is removably and non-rotatably fixed to an upper end of the hitch shaft and is adapted for holding a trailer hitch fixedly thereto. A lower end of the hitch shaft engages a steering assembly cover and further provides a fixed steering sprocket coaxial with the hitch shaft. A drive wheel is rotatably mounted on a horizontal axle, which is positioned between the two arms, and engages a drive sprocket for rotating therewith on the axle. An electric DC motor is fixed to the frame and provides a driven sprocket interconnected with the drive sprocket by a first drive belt. An electrical drive circuit drives the electric motor in either a forward or reverse direction. A steering assembly includes a rotatable steering shaft held in a fixed position by the cover and provides a rotatable steering sprocket at one end and a steering arm at the other end. The rotatable sprocket is interconnected by a second driver belt to a fixed steering sprocket. Rotation of the steering arm results in rotation of the frame and drive wheel with respect to the hitch shaft and the cover means, so as to enable the trailer driver to be steered. A dolly is further included for moving the trailer driver and for storing the trailer driver in an upright orientation.

The present invention is a trailer moving device that is relatively easy to steer while moving a trailer to which it is connected. The present invention is itself easy to move and store, and provides simplified, easy-to-use attachment means for attaching to the trailer. The present invention further provides high traction with the ground. Other features and advantages of the present invention will become apparent from the following more detailed description, taken in conjunction with the accompanying drawings, which illustrates, by way of example, the principles of the invention.

BRIEF DESCRIPTION OF THE DRAWINGS

The accompanying drawings illustrate the invention. In such drawings:

FIG. 1 is front elevational view of the invention, illustrating a removable dolly attached to both a steering assembly and an arm of a frame portion of the invention;

FIG. 1A is a front elevational view of the invention, illustrating the invention as supported and moved by the dolly;

DETAILED DESCRIPTION OF THE PREFERRED EMBODIMENT

Figure 2:
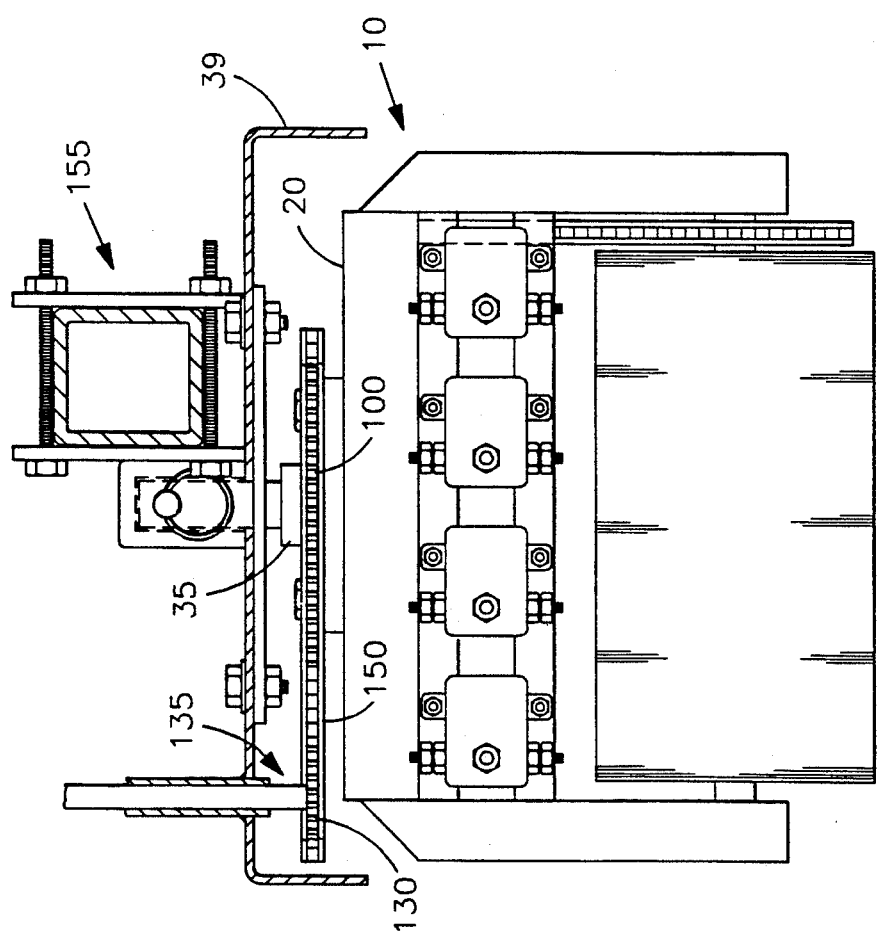
FIG. 2 is a partial cross-sectional view of the invention, illustrating a steering assembly of the invention protectively covered by a cover means.

FIGS. 1 and 2 show a trailer driver 5 for moving and supporting a trailer. An inverted U-shaped frame 10 provides a base 20 for supporting two opposing, parallel, downwardly extending, spaced apart arms 30. The frame 10 is manufactured from a strong, rigid material, such as steel, aluminum, or other metal. A fixed bearing 35 extends upwardly from the base 20 and supports a vertical hitch shaft 38 that is rotatably engaged within the bearing 35. A trailer hitch clamping means 155 is removably and non-rotatably fixed to the hitch shaft 38 and is adapted for holding a tailer hitch 157 of the trailer fixedly thereto. The clamping means 155 preferably includes a mounting pin 159 for releasing the clamping means 155 from an upper end of the hitch shaft 38. The hitch shaft 38 is adapted for engaging a cover means 39, such as a sheet metal cover, and further provides a fixed steering sprocket 100 coaxial with the hitch shaft 38 at a lower end of the hitch shaft 38.

A drive wheel 40 is rotatably mounted on a horizontal axle 50 that is positioned between the two arms 30. The drive wheel 40 may provide a variety of suitable treads for providing high traction between the wheel 40 and a ground surface. The axle 50 extends outwardly from each side of the wheel 40 for engagement with the arms 30, and the drive wheel 40 engages a drive sprocket 60 for rotating therewith on the axle 50.

Figure 3:
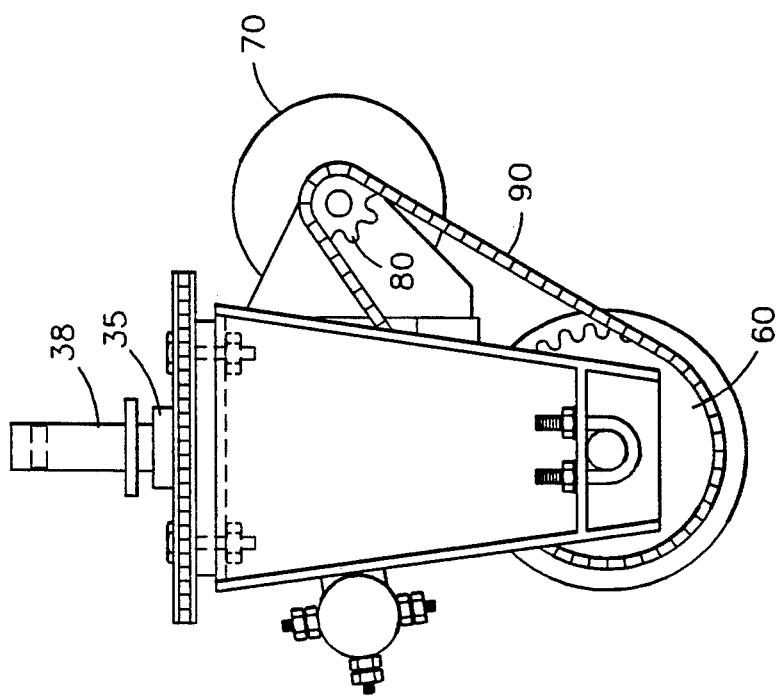
FIG. 3 is a left side elevational view of the invention, illustrating a prime mover of the invention.

A prime mover 70 is fixed to the frame 10 and provides a driven sprocket 80 interconnected with the drive sprocket 60 by a first transfer means 90, such as a flexible yet strong drive belt (FIG. 3). As such, rotation of the driven sprocket 80 causes the drive sprocket 60 and the drive wheel 40 to rotate. The tooth ratio of the driven sprocket 80 to the drive sprocket 60 is preferably in the range of from two-to-one to three-to-one.

Figure 4:
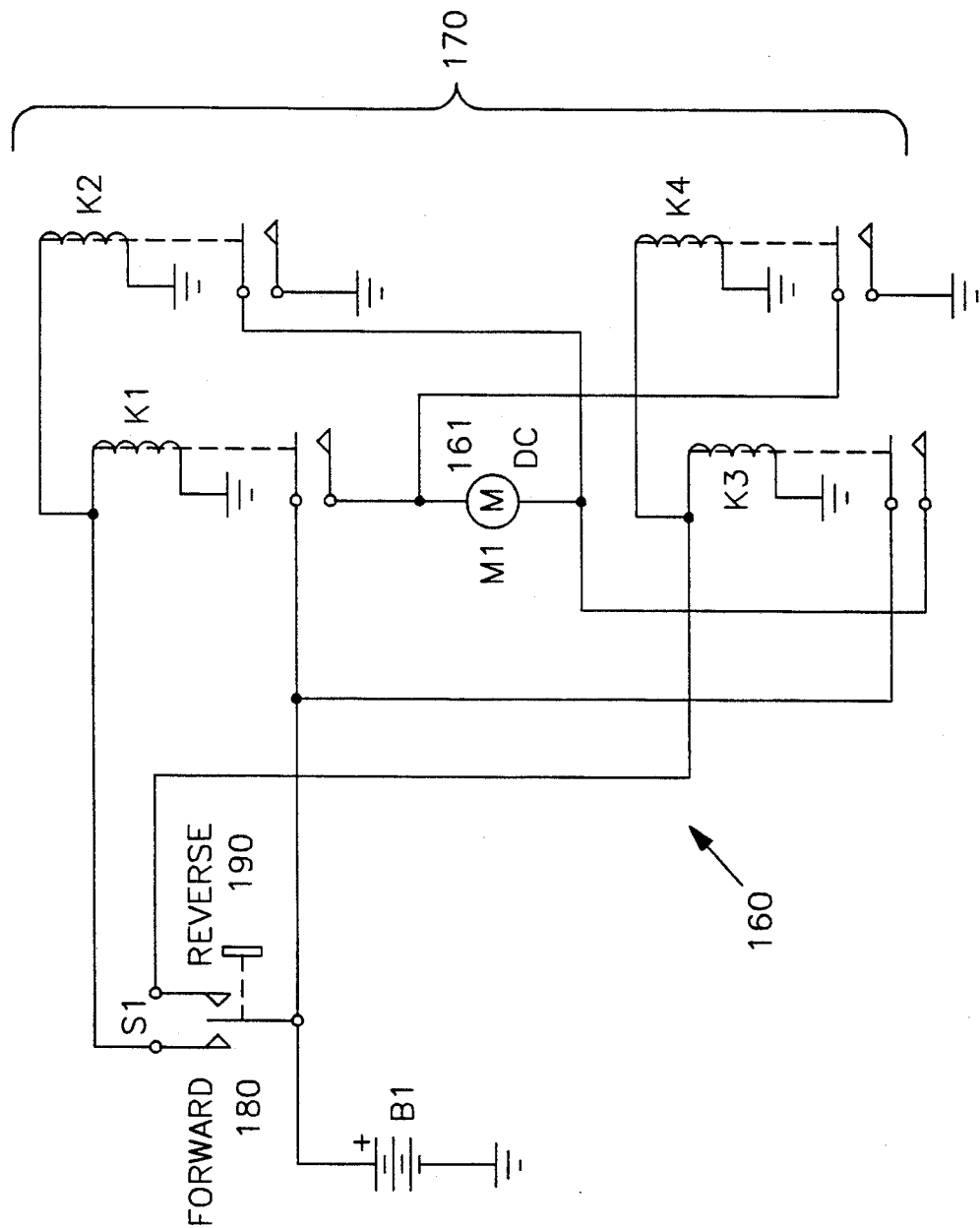
FIG. 4 is a schematic diagram of an electrical drive circuit of the invention.

The prime mover 70 is preferably a direct current electrical motor 161 and further includes an electrical drive circuit 160 (FIG. 4). The electrical drive circuit 160 provides a manual switch S1 for engaging an electrical storage battery B1, the battery B1 being interconnected with the motor 161 through the switch S1. A reversing circuit means 170 is further included in the electrical drive circuit 160 for selecting the direction of current flow in the motor 161 to enable the trailer driver to move in a forward direction or in a reverse direction in accordance with a forward position 180 or a reverse position 190 of the manual switch S1. The reversing circuit means 170 preferably includes four relays K1,K2,K3,K4 grouped into two sets of two relays each. One relay of each set is included on each side of the motor 161 so that in the forward position 180 of the switch S1 one set K1,K2, of the relays provides electrical energy to the motor 161 and conducts said energy away therefrom. In the reverse position 190 of the switch S1 the other set K3,K4 of the relays provides electrical energy to the motor 161 in the opposite direction as with the one set K1,K2 of the relays, and conducts said energy away therefrom. The switch S1 may be mounted anywhere that is convenient on the trailer driver 5, or may be included in a remote device (not shown) for allowing a person to control the trailer driver 5 from a wide range of positions.

A steering assembly 110 includes a rotatable steering shaft 120 held in a fixed position by the cover means 39 and provides a rotatable steering sprocket 130 at one end 135 and a steering arm 140 at the other end 145. The rotatable sprocket 130, laterally displaced from and in the same rotational plane as the fixed steering sprocket 100, is interconnected by a second transfer means 150, such as a second flexible yet strong drive belt, to a fixed steering sprocket 100. As such, rotation of the steering arm 140 applies a rotational torque, through the steering shaft 120, the rotatable steering sprocket 130, the second transfer means 150, and the fixed steering sprocket 100, to the frame 10 and drive wheel 40. The frame 10 and drive wheel 40 are thereby rotated with respect to the hitch shaft 38 and the cover means 39, so as to enable the trailer driver 5 to be steered. The tooth ratio of the fixed steering sprocket 100 to the rotatable steering sprocket 130 is approximately 4.5 to one, thereby providing a large mechanical advantage to the person rotating the steering arm 140.

Further, a dolly 200 may be included for moving the trailer driver 5 and for storing the trailer driver 5 in an upright orientation. The dolly 200 provides a first attachment means 210 for removably attaching the dolly 200 to one of the arms 30 of the frame 10. The first attachment means 210 is preferably an arm with two holes for engaging two axle mounting bolts of the frame 10 therethrough. A second attachment means 220 of the dolly 200 removably attaches to the steering assembly 110, and preferably includes a pin that further serves to prevent the rotation of the steering arm 140. A pair of wheels 230 is fixed to and supports the dolly 200 upon the surface. As such, the trailer driver 5 can be lifted onto the dolly 200 by engaging the dolly 200 to the trailer driver 5 and tilting the trailer driver 5 rotatingly toward the dolly 200 (FIG. 1A).

In use, the trailer hitch 157 is fixed to the trailer hitch clamping means 155 of the trailer driver 5, and the steering arm 140 is rotated so as to orient the drive wheel 40 in a desired direction. The switch S1 of the electrical drive circuit 160 is activated as appropriate for driving the drive wheel 40 in the desired direction, whereby the trailer is supported on and moved by the trailer driver 5. After the trailer has been moved to a desired location, the trailer driver 5 may be disengaged from the trailer by removing the mounting pin 159, attaching the dolly 200, and moving the trailer driver 5 to a desired storage location.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A trailer driver for a trailer comprising:
   an inverted U-shaped frame providing a base having two integral, opposing, mutually parallel, downwardly extending, spaced apart arms, and an upwardly extending fixed bearing supporting a vertical hitch shaft rotatably engaged within the bearing, the hitch shaft adapted for engaging a cover means, and further providing a fixed steering sprocket coaxial with the hitch shaft;
   a horizontal axle having rotatably mounted thereon a drive wheel and drive sprocket, the axle fixed to the arms and positioned between same;
   a prime mover fixed to the frame and providing a driven sprocket interconnected with the drive sprocket by a first transfer means for driving the driven sprocket and drive wheel;
   a steering assembly comprising a rotatable steering shaft held in a fixed orientation by the cover means and providing a rotatable steering sprocket at one end of the steering shaft, the rotatable steering sprocket being laterally displaced from the fixed steering sprocket, and a steering arm at the other end of the steering shaft, the rotatable and fixed steering sprockets being interconnected by a second transfer means so that rotation of the steering arm applies torque, through the steering shaft, rotatable steering sprocket, second transfer means and fixed steering sprocket, to the frame and drive wheel thereby rotating the frame, and drive wheel with respect to the hitch shaft and cover means;
   a trailer hitch clamping means removably and non-rotatably attached to the hitch shaft and adapted for holding a trailer hitch fixedly thereto, whereby a trailer is supported on the frame for moving by the trailer driver.

2. The trailer driver of claim 1 wherein the prime mover is a direct current electrical motor and further including an electrical drive circuit providing a manual switch for engaging an electrical storage battery, the battery being interconnected with the motor through the switch, and reversing circuit means for selecting the direction of current flow in the motor to enable the trailer driver to move in a forward direction and in a reverse direction in accordance with a forward and a reverse position of the manual switch.

3. The trailer driver of claim 2 wherein the reversing circuit means includes two sets of two relays each, one relay of each set being included on each side of the motor electrical drive circuit so that in the forward position of the switch one set of the relays provides electrical energy to the motor and conducts said energy of the one set away from the motor and so that in the reverse position of the switch the other set of the relays provides electrical energy to the motor in the opposite direction as with the one set of the relays, and conducts said energy of the other set of the relays away from the motor.

4. The trailer driver of claim 1 further including a dolly for moving the trailer driver and for storing the trailer driver in an upright orientation, the dolly providing first attachment means for removably attaching the dolly to one of the arms of the frame, second attachment means for removably attaching the dolly to the cover means, and a pair of wheels rotatably mounted under the first attachment means for supporting the dolly upon a surface, such that the trailer driver can be lifted onto the dolly by engaging the first attachment means with the one of the arms and then tilting the trailer driver rotatably toward the dolly, for moving to and from a storage location.

5. The trailer driver of claim 1 wherein the tooth ratio of the fixed steering sprocket to the rotatable steering sprocket is approximately 4.5 to 1.

6. The trailer driver of claim 1 wherein the tooth ratio of the driven sprocket to the drive sprocket is in the range of from two-to-one to three-to-one.

* * * * *